P. GAVIN.
TUBE EXPANDER.
APPLICATION FILED JULY 15, 1921.
1,393,620.
Patented Oct. 11, 1921.
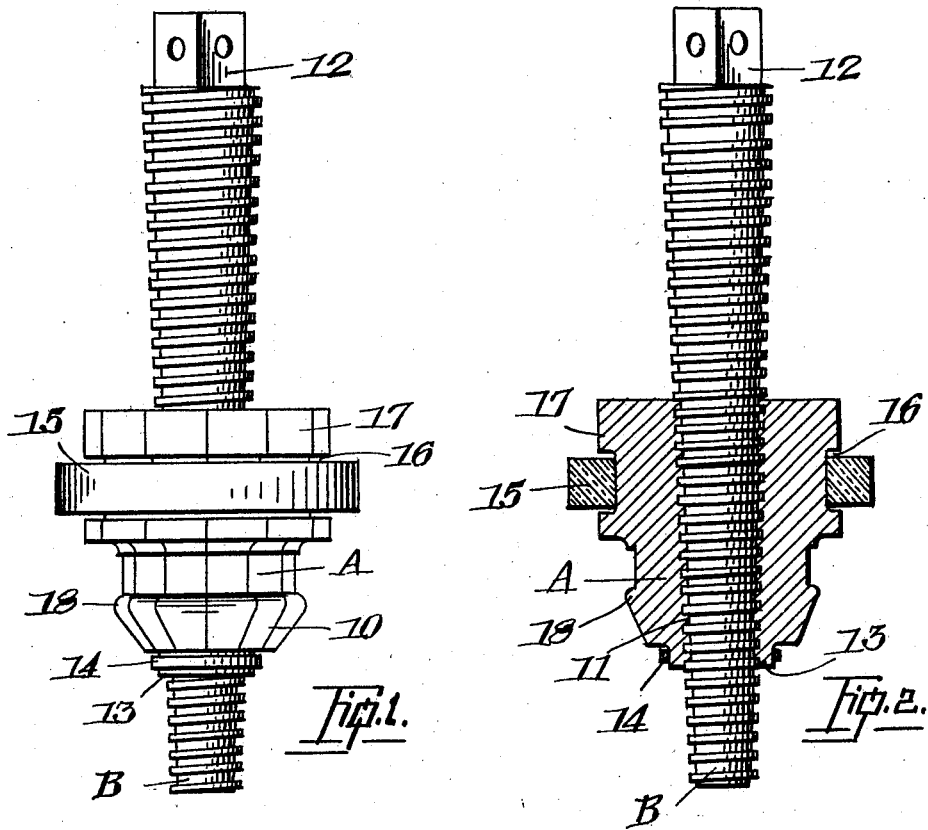
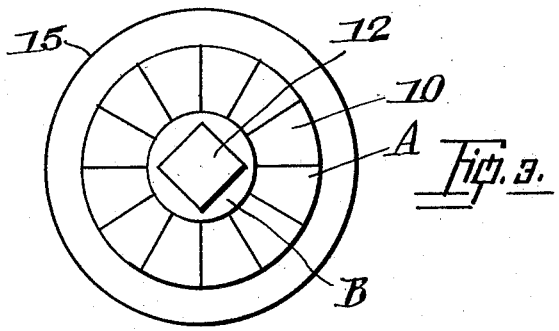
INVENTOR
PETER GAVIN.

UNITED STATES PATENT OFFICE.

PETER GAVIN, OF VANCOUVER, BRITISH COLUMBIA, CANADA.

TUBE-EXPANDER.

1,393,620.  Specification of Letters Patent.  Patented Oct. 11, 1921.

Continuation of application Serial No. 268,657, filed December 28, 1918. This application filed July 15, 1921. Serial No. 485,007.

*To all whom it may concern:*

Be it known that I, PETER GAVIN, a subject of the King of Great Britain, and resident of the city of Vancouver, in the Province of British Columbia and Dominion of Canada, have invented certain new and useful Improvements in Tube-Expanders, (for which I filed an application in Canada Dec. 27, 1918, on which Patent No. 209,641 issued March 22, 1921,) of which the following is a specification.

This application is a continuation of my earlier application, Serial No. 268,657, filed December 28, 1918.

This invention relates to improvements in tube expanders, and the objects of the invention are to provide a simple and effective expander in which all the operative parts will efficiently perform the functions required of them.

And it consists essentially of the improved construction hereinafter described in detail in the accompanying specifications and drawings.

In the drawings:

Figure 1 is a plan view of the expander.

Fig. 2 is a sectional view, and

Fig. 3 is an end view.

In the drawings, like characters of reference indicate corresponding parts in all the figures.

Referring to the drawings:

A indicates the expanding member formed in a large number of sections 10 meeting on planes having angles to each other whereby they may be uniformly expanded, the said sections having a central bore 11 provided with a squared thread extending throughout its length and adapted to fit a corresponding thread provided on an expanding pin B, which said expanding pin is continuously tapered from one end to the other and formed at one end with a squared and perforated head 12 by which it may be turned.

Each of the sections 10 is formed with a projecting flange 13 designed together to form an annular flange, which is embraced by a resilient retaining member 14 such as a rubber ring which retains the sections in position. They are also retained in position by a resilient rubber ring 15 which extends in an annular recess 16 formed in the recessed flange section 17 on the sections 10.

The expanding member is also formed with a rounded nose 18 of less diameter than the flange 17, the said rounded nose merging into a conical portion at its forward end.

It will be seen that, as the expanding pin B is turned, it will expand the sections at all points of its travel. Rotation may be imparted to the pin by a wrench engaging with a flanged head or by a pin inserted through the perforations.

As many changes could be made in the above construction and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A sectional tube expander formed in a large number of sections meeting on planes having acute angles to each other, and having a bore provided with a squared thread extending throughout its length and having projecting flanges at one end, the said sections having a rounded nose at one end adapted to enter the tube to be expanded, and a recessed flange at the opposite end of larger diameter than the nose, a correspondingly threaded and tapered pin fitting said bore and rotatable therein, said pin being so fitted to the bore as to spread the expander sections at all points of its travel therethrough, means formed upon one end of said pin whereby rotation may be imparted thereto, a rubber ring engaging the said recessed flange, and a second rubber ring engaging the projecting flanges of the expander adapted to retain them in operative position on the pin.

In witness whereof I have hereunto set my hand in the presence of two witnesses.

PETER GAVIN.

Witnesses:
 C. F. REDOS,
 E. S. JOHNSON.